United States Patent
Park et al.

(10) Patent No.: US 12,134,196 B2
(45) Date of Patent: Nov. 5, 2024

(54) METHOD FOR AUTOMATICALLY SETTING COLLISION SENSITIVITY OF COLLABORATIVE ROBOT

(71) Applicant: NEUROMEKA, Seoul (KR)

(72) Inventors: Jong Hoon Park, Namyangju (KR); Kwang Hyun Han, Seongnam (KR); Yun Seo Che, Sejong (KR); Gu Hee Jeong, Seoul (KR)

(73) Assignee: NEUROMEKA, Seoul (KR)

( * ) Notice: Subject to any disclaimer, the term of this patent is extended or adjusted under 35 U.S.C. 154(b) by 335 days.

(21) Appl. No.: 17/629,266

(22) PCT Filed: Oct. 30, 2020

(86) PCT No.: PCT/KR2020/015019
§ 371 (c)(1),
(2) Date: Jan. 21, 2022

(87) PCT Pub. No.: WO2021/086103
PCT Pub. Date: May 6, 2021

(65) Prior Publication Data
US 2022/0241969 A1  Aug. 4, 2022

(30) Foreign Application Priority Data

Oct. 30, 2019 (KR) .................. 10-2019-0136722
Oct. 30, 2019 (KR) .................. 10-2020-0048730

(51) Int. Cl.
*B25J 9/16* (2006.01)
(52) U.S. Cl.
CPC .................. *B25J 9/1666* (2013.01)

(58) Field of Classification Search
CPC ...................................... B25J 9/1666
See application file for complete search history.

(56) References Cited

U.S. PATENT DOCUMENTS

| 10,131,053 B1 | 11/2018 | Sampedro et al. |
| 2017/0357242 A1 | 12/2017 | Watanabe et al. |
| 2018/0164170 A1* | 6/2018 | Nakata ............... B25J 9/1674 |
| 2019/0009412 A1* | 1/2019 | Khan .................. B25J 9/1666 |
| 2019/0221037 A1* | 7/2019 | Sugaya ............. G05B 19/4069 |
| 2019/0260313 A1 | 8/2019 | Yamamoto et al. |

(Continued)

FOREIGN PATENT DOCUMENTS

| CN | 110340942 A | 10/2019 |
| JP | 2005103674 A | 4/2005 |
| KR | 101262277 B1 | 5/2013 |

(Continued)

OTHER PUBLICATIONS

The Extended European Search Report for European Patent Application No. 20883376.4, dated Oct. 23, 2023.

*Primary Examiner* — Jaime Figueroa
*Assistant Examiner* — Mohamad O El Sayah

(57) ABSTRACT

A method for automatically setting the collision sensitivity of a collaborative robot, according to one embodiment of the present invention, comprises the steps of: operating a collaborative robot; acquiring torque-related data associated with torque that acts on each joint of the collaborative robot while the collaborative robot operates; and calculating a collision threshold value on the basis of the acquired torque-related data.

13 Claims, 11 Drawing Sheets

| first speed level | first section | second section | third section | fourth section | T max |
|---|---|---|---|---|---|
| first joint | $T_{avg}1\text{-}2$ | $T_{avg}1\text{-}2$ | $T_{avg}1\text{-}3$ | $T_{avg}1\text{-}4$ | $T_{avg}1\text{-}3$ |
| second joint | $T_{avg}2\text{-}2$ | $T_{avg}2\text{-}2$ | $T_{avg}2\text{-}3$ | $T_{avg}2\text{-}4$ | $T_{avg}2\text{-}2$ |
| third joint | $T_{avg}3\text{-}1$ | $T_{avg}3\text{-}2$ | $T_{avg}3\text{-}3$ | $T_{avg}3\text{-}4$ | $T_{avg}3\text{-}4$ |
| fourth joint | $T_{avg}4\text{-}1$ | $T_{avg}4\text{-}2$ | $T_{avg}4\text{-}3$ | $T_{avg}4\text{-}4$ | $T_{avg}4\text{-}2$ |
| fifth joint | $T_{avg}5\text{-}1$ | $T_{avg}5\text{-}2$ | $T_{avg}5\text{-}3$ | $T_{avg}5\text{-}4$ | $T_{avg}5\text{-}1$ |
| sixth joint | $T_{avg}6\text{-}1$ | $T_{avg}6\text{-}2$ | $T_{avg}6\text{-}3$ | $T_{avg}6\text{-}4$ | $T_{avg}6\text{-}3$ |

(56) References Cited

U.S. PATENT DOCUMENTS

2022/0009104 A1* 1/2022 Wahrmann Lockhart ................... A61H 1/0274
2022/0233271 A1* 7/2022 Peine ...................... A61B 90/06

FOREIGN PATENT DOCUMENTS

| KR | 20130102476 A | 9/2013 |
| KR | 20150080050 A | 7/2015 |
| KR | 20170103424 A | 9/2017 |
| KR | 10-1982226 B1 | 5/2019 |
| KR | 102105626 B1 | 4/2020 |

\* cited by examiner

FIG. 9

| first speed level | first section | second section | third section | fourth section | T max |
|---|---|---|---|---|---|
| first joint | T avg1-2 | T avg1-2 | T avg1-3 | T avg1-4 | T avg1-3 |
| second joint | T avg2-2 | T avg2-2 | T avg2-3 | T avg2-4 | T avg2-2 |
| third joint | T avg3-1 | T avg3-2 | T avg3-3 | T avg3-4 | T avg3-4 |
| fourth joint | T avg4-1 | T avg4-2 | T avg4-3 | T avg4-4 | T avg4-2 |
| fifth joint | T avg5-1 | T avg5-2 | T avg5-3 | T avg5-4 | T avg5-1 |
| sixth joint | T avg6-1 | T avg6-2 | T avg6-3 | T avg6-4 | T avg6-3 |

FIG. 10

| second speed level | first section | second section | third section | fourth section | T max |
|---|---|---|---|---|---|
| first joint | T avg1-2 | T avg1-2 | T avg1-3 | T avg1-4 | T avg1-3 |
| second joint | T avg2-2 | T avg2-2 | T avg2-3 | T avg2-4 | T avg2-1 |
| third joint | T avg3-1 | T avg3-2 | T avg3-3 | T avg3-4 | T avg3-4 |
| fourth joint | T avg4-1 | T avg4-2 | T avg4-3 | T avg4-4 | T avg4-1 |
| fifth joint | T avg5-1 | T avg5-2 | T avg5-3 | T avg5-4 | T avg5-1 |
| sixth joint | T avg6-1 | T avg6-2 | T avg6-3 | T avg6-4 | T avg6-3 |

METHOD FOR AUTOMATICALLY SETTING COLLISION SENSITIVITY OF COLLABORATIVE ROBOT

TECHNICAL FIELD

The disclosure relates to a method of automatically setting collision sensitivity of a collaborative robot, and more particularly to a method of automatically setting a threshold value of collision that causes a collaborative robot to stop working.

BACKGROUND ART

Recently, collaborative robots that can work in the same space as humans have emerged. The collaborative robot refers to a robot that works nearby humans, and is manufactured to be smaller and operate more slowly for human safety than a conventional industrial robot.

The reason why the collaborative robots are used instead of the existing expensive general industrial robots is because the collaborative robot does not require a large space due to no need of a fence for safety, has a program to which anyone can easily make some changes through programming, and is specialized for working with humans due to its safety stop function based on collision detection However, it is necessary to determine whether an external force generated during the actuation of the collaborative robot is caused by a collision or a dynamic characteristic, but it is difficult to clearly distinguish between the external force caused by the collision and the external force caused by the dynamic characteristic. Therefore, a malfunction has conventionally occurred as if a collision is detected even though there are no collisions.

In addition, the collaborative robot may have to sensitively respond to a collision according to its work environments. On the other hand, there is also a work environment in which the collaborative robot needs to have low sensitivity to a collision because an excessively sensitive response delays work.

However, there is a great variety of work environments in which the collaborative robot is installed, and it takes a considerable amount of time for even a professional engineer to adjust the collision sensitivity of the collaborative robot. Therefore, even for professional collaborative-robot manufacturing or installing companies, it is not easy to set the sensitivity of the collaborative robot according to the work environments.

DISCLOSURE

Technical Problem

An aspect of the disclosure is to provide a method of automatically setting collision sensitivity of a collaborative robot, by which it is easy and convenient to automatically set the collision sensitivity suitable for a work environment of the collaborative robot.

The aspects of the disclosure are not limited to the foregoing aspect, and other aspects not mentioned above will become apparent to those skilled in the art from the following descriptions.

Technical Solution

To achieve the aspect of the disclosure, a method of automatically setting collision sensitivity of a collaborative robot according to an embodiment includes: actuating the collaborative robot; obtaining torque-related data related to torque exerted on joints of the collaborative robot during actuation of the collaborative robot; and calculating a collision threshold value based on the obtained torque-related data.

The calculating the collision threshold value may include: calculating an average value of the obtained torque-related data according to sections; selecting a maximum value among the average values of the sections; and calculating the collision threshold value based on the selected maximum value.

The torque-related data may include a current value to be applied to an actuator provided in each joint of the collaborative robot and actuating the collaborative robot.

The torque-related data may include data measured by a torque sensor that measures torque exerted on each joint of the collaborative robot.

The method may further include selecting a collision sensitivity level, wherein the calculating the collision threshold value may include calculating the collision threshold value based on the selected collision sensitivity level and the obtained torque-related data.

The collision threshold value may be calculated in proportion to the selected collision sensitivity level.

The actuating the collaborative robot may include repetitively actuating the collaborative robot at different speed levels, the obtaining the torque-related data may include obtaining the torque-related data according to speed levels, and the calculating the collision threshold value may include calculating a function for calculating the collision threshold value by using the speed level as a variable based on the torque-related data obtained according to the speed levels.

The method may further include displaying a parameter of the calculated function on a screen.

The method may further include selecting one of a plurality of programs that cause the collaborative robot to be actuated in different actions, wherein the actuating the collaborative robot includes actuating the collaborative robot based on a program selected among the plurality of programs.

The collision threshold value may be calculated individually for each joint of the collaborative robot.

Other details of the disclosure are included in the detailed description and the accompanying drawings

Advantageous Effects

According to embodiments of the disclosure, effects are at least as follows.

It is easy and convenient to automatically set collision sensitivity suitable for a work environment of a collaborative robot.

The effects according to the disclosure are not limited to the foregoing example, and more various effects are involved in the present specification.

DESCRIPTION OF DRAWINGS

FIG. 9 is a diagram for describing a method of selecting a maximum value in torque-related data obtained at a first speed level in step S16 of FIG. 7.

FIG. 10 is a diagram for describing a method of selecting a maximum value in torque-related data obtained at a second speed level in step S16 of FIG. 7.

BEST MODE

Figure 1:
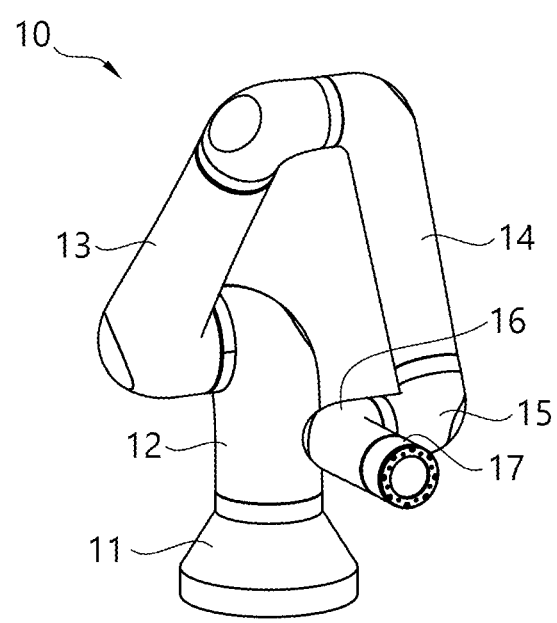
FIG. 1 is a perspective view showing a multiple-degrees-of-freedom (MDOF) collaborative robot.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to understand the category of the disclosure. The disclosure is defined by the category of the claims.

Further, embodiments of the disclosure will be described with reference to cross-sectional views and/or schematic views as idealized exemplary illustrations. Therefore, the illustrations may be varied in shape depending on manufacturing techniques, tolerance, and/or etc. Further, elements in the drawings may be relatively enlarged or reduced for convenience of description. Like numerals refer to like elements throughout.

Below, the disclosure will be described with reference to the accompanying drawings of illustrating as system for automatically setting collision sensitivity of a collaborative robot and a method of automatically setting the collision sensitivity of the collaborative robot according to the disclosure.

FIG. 1 is a perspective view showing a multiple-degrees-of-freedom (MDOF) collaborative robot.

A collaborative robot 10 includes a plurality of joints 12, 13, 14, 15, 16 and 17 to carry out MDOF motion. FIG. 1 illustrates the collaborative robot 10 using six joints 12, 13, 14, 15, 16 and 17 to have six degrees of freedom as an example of the MDOF collaborative robot.

A first joint 12 is pivotally coupled to an upper portion of a base 11, and pivots on a Z axis (in a vertical direction in FIG. 1). The first joint 12 includes a first end side (i.e., a side facing the base 11) and a second end side (i.e., a side facing a second joint 13), which are on planes perpendicular to each other.

A second joint 13 is pivotally coupled to a second end portion of the first joint 12. Because the first end side and the second end side of the first joint 12 are on the planes perpendicular to each other, the second joint 13 pivots on an axis perpendicular to the pivot axis of the first joint 12. The second joint 13 include a first end side (i.e., a side facing the first joint 12) and a second end side (i.e., a side facing the third joint 14), which are on planes parallel to or aligned with each other.

A third joint 14 is pivotally coupled to a second end portion of the second joint 13. Because the first end side and the second end side of the second joint 13 are on the planes parallel to or aligned with each other, the third joint 14 pivots on an axis parallel to the pivot axis of the second joint 13. The third joint 14 includes a first end side (i.e., a side facing the second joint 13) and a second end side (i.e., a side facing the fourth joint 15), which are on planes perpendicular to each other.

A fourth joint 15 is pivotally coupled to a second end portion of the third joint 14. Because the first end side and the second end side of the third joint 14 are on the planes perpendicular to each other, the fourth joint 15 pivots on an axis perpendicular to the pivot axis of the third joint 14. The fourth joint 15 includes a first end side (i.e., a side facing the third joint 14) and a second end side (i.e., a side facing the fifth joint 16), which are on planes perpendicular to each other.

A fifth joint 16 is pivotally coupled to a second end portion of the fourth joint 15. Because the first end side and the second end side of the fourth joint 15 are on the planes perpendicular to each other, the fifth joint 16 pivots on an axis perpendicular to the pivot axis of the fourth joint 15. The fifth joint 16 includes a first end side (i.e., a side facing the fourth joint 15) and a second end side (i.e., a side facing the sixth joint 17), which are on planes perpendicular to each other.

A sixth joint 17 is pivotally coupled to a second end portion of the fifth joint 16. Because the first end side and the second end side of the fifth joint 16 are on the planes perpendicular to each other, the sixth joint 17 pivots on an axis perpendicular to the pivot axis of the fifth joint 16. The fifth joint 16 includes a first end side (i.e., a side facing the fourth joint 15) and a second end side which are on planes parallel to each other.

The second end portion of the sixth joint 17 is mounted with an end tool (not shown). There are various kinds of end tools according to work or the like to be performed by the collaborative robot 10, and the second end portion of the sixth joint 17 is mountable with various replaceable end tools.

The joints 12, 13, 14, 15, 16 and 17 are provided with and turned by actuators (not shown), respectively.

Unlike a conventional industrial robot that operates in a space separated from a worker by a fence or the like, the collaborative robot 10 operates sharing a work space with a worker. Accordingly, in preparation for possibility of a collision with a worker, the collaborative robot 10 is designed to operate at a speed not to inflict injury upon the worker even though the collision with the worker occurs during the actuation, and to detect a collision with the worker and immediately stop the actuation.

Figure 2:
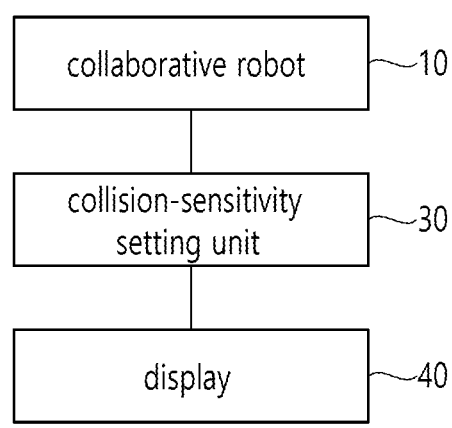
FIG. 2 is a block diagram schematically showing a system for automatically setting collision sensitivity of a collaborative robot according to a first embodiment of the disclosure.
Figure 3:
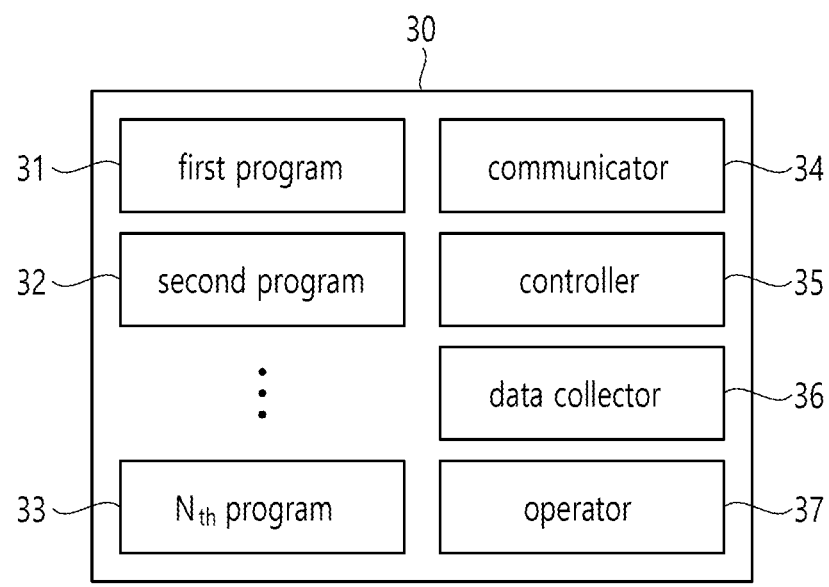
FIG. 3 is a block diagram schematically showing a configuration of a collision-sensitivity setting unit of FIG. 2.

FIG. 2 is a block diagram schematically showing a system for automatically setting collision sensitivity of a collaborative robot according to a first embodiment of the disclosure, and FIG. 3 is a block diagram schematically showing a configuration of a collision-sensitivity setting unit of FIG. 2.

As shown in FIG. 2, a system 1 for automatically setting collision sensitivity of a collaborative robot according to the first embodiment of the disclosure includes a collaborative robot 10, a collision-sensitivity setting unit 30, and a display 40. The display 40 refers to a device for visually displaying information, and may include a dedicated terminal, a smartphone, a tablet, a computer, etc.

In the system 1 for automatically setting collision sensitivity of a collaborative robot according to the first embodiment of the disclosure, the collision-sensitivity setting unit 30 may be configured to have a function of setting the collision sensitivity in addition to a general function of a robot controller for controlling the collaborative robot 10.

As shown in FIG. 3, the collision-sensitivity setting unit 30 includes a plurality of programs 31, 32 and 33, a communicator 34, a controller 35, a data collector 36, and an operator 37.

The plurality of programs 31, 32 and 33 refers to instructions for performing a specific action of the collaborative robot 10, and the plurality of programs 31, 32 and 33 may previously be stored in the collision-sensitivity setting unit 30 according to actions to be performed by the collaborative robot 10.

For example, a first program 31 may be a program for making the collaborative robot 10 to carry out a pick-and-place action, and a second program 32 may be a program for making the collaborative robot 10 to carry out a bolt-fastening action. Besides, the programs 31, 32 and 33 for various actions, for example, welding, polishing, packaging, assembling, molding, testing, computerized numerical control (CNC) and the like actions to be realizable by the collaborative robot 10 may be stored in the collision-sensitivity setting unit 30.

The communicator 34 is configured to manage communication between the collision-sensitivity setting unit 30 and the collaborative robot 10 and communication between the collision-sensitivity setting unit 30 and the display 40.

The communicator 34 transmits a control instruction based on a program selected among the plurality of programs 31, 32 and 33 to the collaborative robot 10, and receives control results of the control instruction from the collaborative robot 10 and torque-related data from the joints 12, 13, 14, 15, 16 and 17 of the collaborative robot 10.

The torque-related data may be a current value to be applied to the actuator for actuating each of the joints 12, 13, 14, 15, 16 and 17 of the collaborative robot 10. The current value to be applied to the actuator is in proportion to torque needed for actuating the joints 12, 13, 14, 15, 16 and 17, and therefore the current value to be applied to the actuator is used as the torque-related data for estimating the torque exerted on the joints 12, 13, 14, 15, 16 and 17.

When the joints 12, 13, 14, 15, 16 and 17 of the collaborative robot 10 are respectively provided with torque sensors, the torque-related data is based on measurement values of the torque sensors.

The communicator 34 provides an option selection user interface (UI) (to be described later) to the display 40, and transmits a calculated collision threshold value, a collision threshold function or the parameter (a constant value) of the collision threshold function.

The controller 35 is configured to control the actuation of the collaborative robot 10 based on the program selected among the plurality of programs 31, 32 and 33. The controller 35 may be configured to realize a robot model-based high-speed real-time control having a control frequency of 4 kHz based on Ethernet communication.

The controller 35 may improve the actuating precision of the collaborative robot 10 through real-time robust position control. For example, the controller 35 may control the joints 12, 13, 14, 15, 16 and 17 of the collaborative robot 10 based on combination of feedforward and robot state variable-based feedback control.

The data collector 36 is configured to collect the torque-related data related to torque exerted on the joints 12, 13, 14, 15, 16 and 17 of the collaborative robot 10 while the collaborative robot 10 is operating.

The operator 37 is configured to calculate the collision threshold value or the collision threshold function about the joints 12, 13, 14, 15, 16 and 17 of the collaborative robot 10 based on the torque-related data collected by the data collector 36. In this regard, details will be described later.

Figure 4:
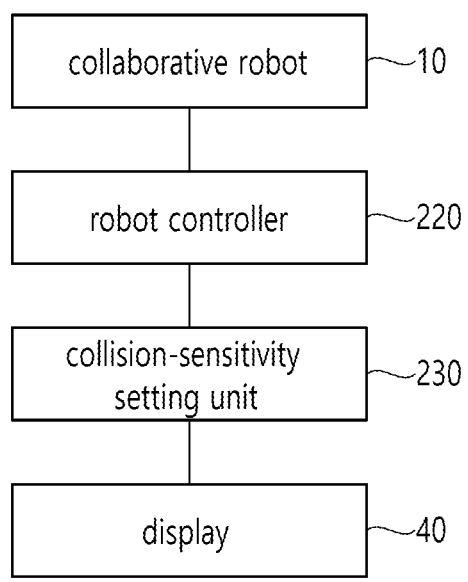
FIG. 4 is a block diagram schematically showing a system for automatically setting collision sensitivity of a collaborative robot according to a second embodiment of the disclosure.
Figure 5:
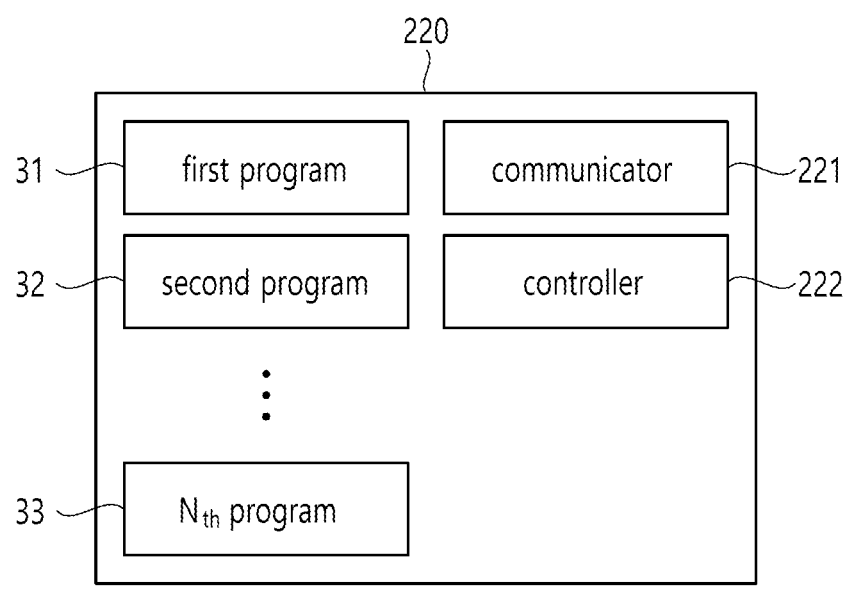
FIG. 5 is a block diagram schematically showing a configuration of a robot controller of FIG. 4.
Figure 6:
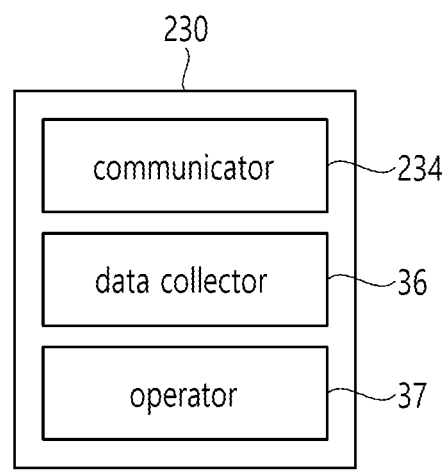
FIG. 6 is a block diagram schematically showing a configuration of a collision-sensitivity setting unit of FIG. 4.

FIG. 4 is a block diagram schematically showing a system for automatically setting collision sensitivity of a collaborative robot according to a second embodiment of the disclosure, FIG. 5 is a block diagram schematically showing a configuration of a robot controller of FIG. 4, and FIG. 6 is a block diagram schematically showing a configuration of a collision-sensitivity setting unit of FIG. 4.

As shown in FIG. 4, a system 2 for automatically setting collision sensitivity of a collaborative robot according to the second embodiment of the disclosure includes a collaborative robot 10, a robot controller 220, a collision-sensitivity setting unit 230 and a display 40.

In the system 2 for automatically setting collision sensitivity of a collaborative robot according to the second embodiment of the disclosure, the collision-sensitivity setting unit 30 is used as connected to a general robot controller 220 for controlling the collaborative robot 10. Therefore, the system 2 may be used for the collaborative robot 10 to be controlled by the general robot controller 220 having no functions of automatically setting the collision sensitivity.

As shown in FIG. 5, the robot controller 220 includes a plurality of programs 31, 32 and 33, a communicator 221, and a controller 222.

The plurality of programs 31, 32 and 33 refers to instructions for performing a specific action of the collaborative robot 10 as described above, and repetitive descriptions thereof will be avoided.

The communicator 221 is configured to manage communication between the robot controller 220 and the collaborative robot 10 and communication between the robot controller 220 and the collision-sensitivity setting unit 230.

The communicator 221 transmits a control instruction based on a program selected among the plurality of programs 31, 32 and 33 to the collaborative robot 10, and receives control results of the control instruction from the collaborative robot 10. Further, the communicator 221 receives torque-related data from the joints 12, 13, 14, 15, 16 and 17 of the collaborative robot 10 and transmits the torque-related data to the collision-sensitivity setting unit 230.

The controller 222 is configured to control the actuation of the collaborative robot 10 based on the program selected among the plurality of programs 31, 32 and 33.

As shown in FIG. 6, the collision-sensitivity setting unit 230 includes a communicator 234, a data collector 36, and an operator 37.

The communicator 234 is configured to manage communication between the robot controller 220 and the collision-sensitivity setting unit 230 and communication between the collision-sensitivity setting unit 230 and the display 40.

The communicator 234 receives the torque-related data about the joints 12, 13, 14, 15, 16 and 17 of the collaborative robot 10 from the robot controller 220.

The data collector 36 and the operator 37 are the same as those described above, and thus repetitive descriptions thereof will be avoided.

Below, a method of automatically setting collision sensitivity of a collaborative robot according to the disclosure will be described.

For convenience of description, the description will be made with reference to the system 1 for automatically setting the collision sensitivity of the collaborative robot according to the first embodiment of the disclosure.

Figure 7:
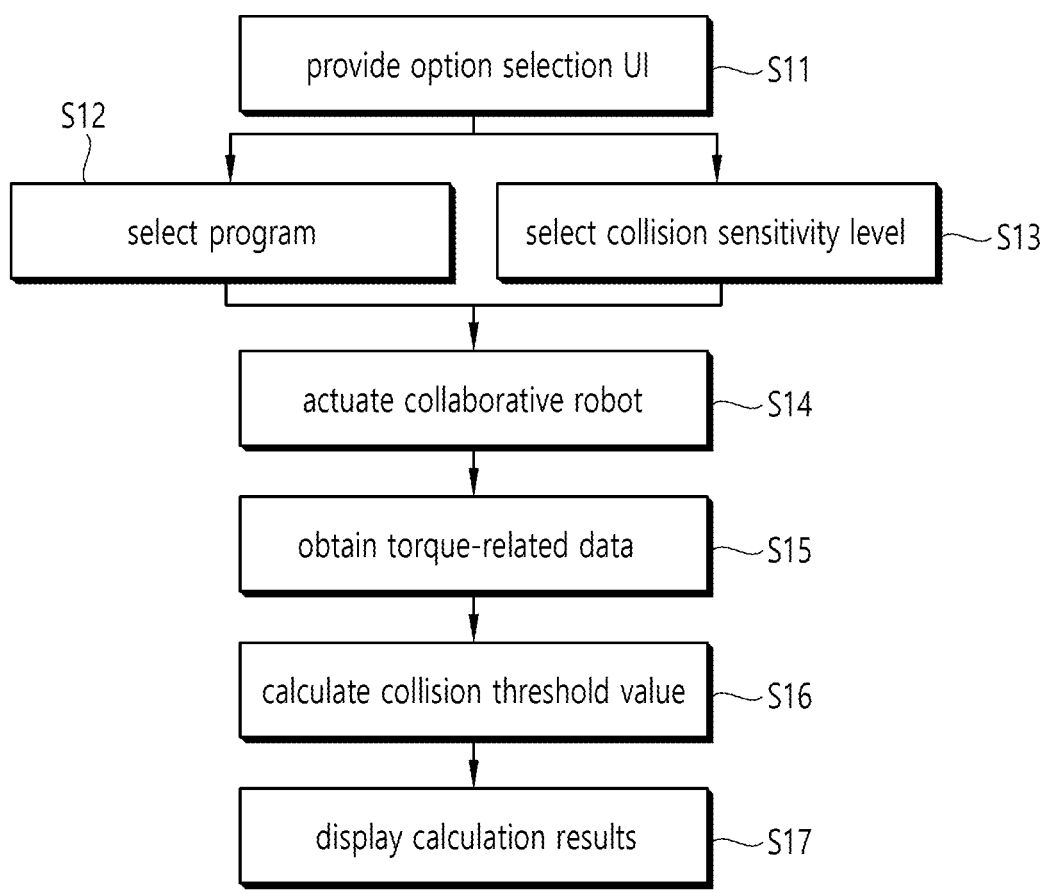
FIG. 7 is a flowchart for describing a method of automatically setting collision sensitivity of a collaborative robot according to the disclosure.
Figure 8:
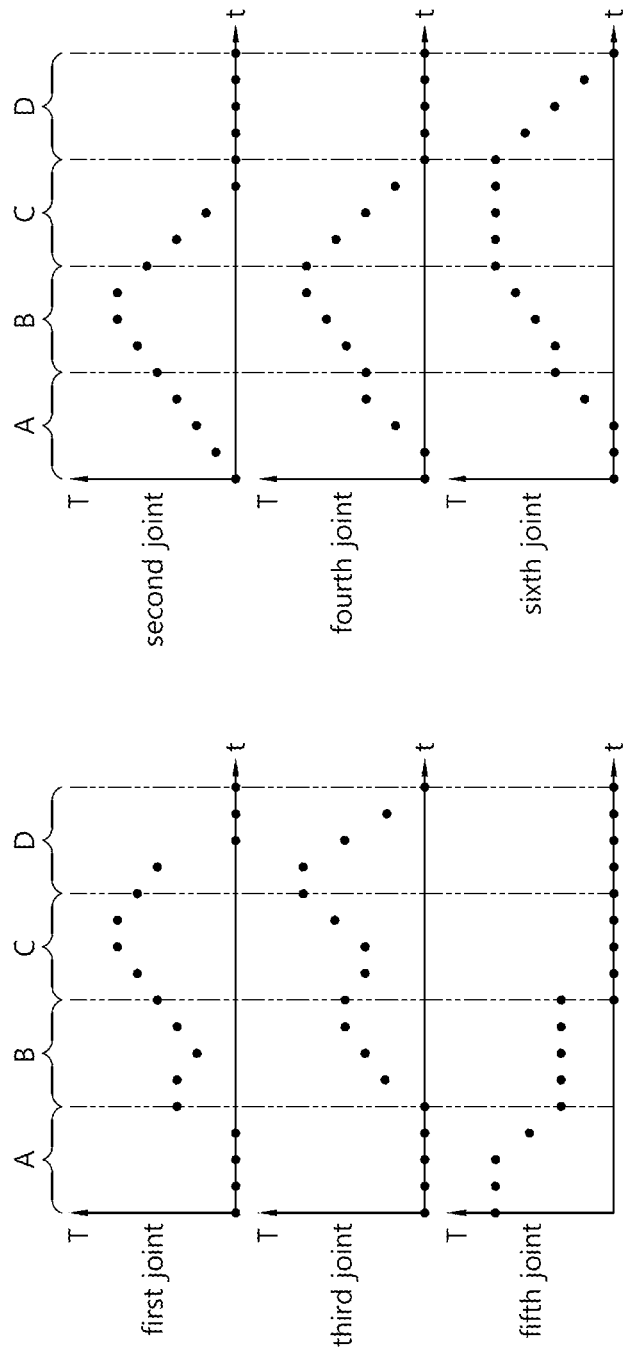
FIG. 8 is a graph showing torque-related data obtained in step S15 of FIG. 7.
Figure 11:
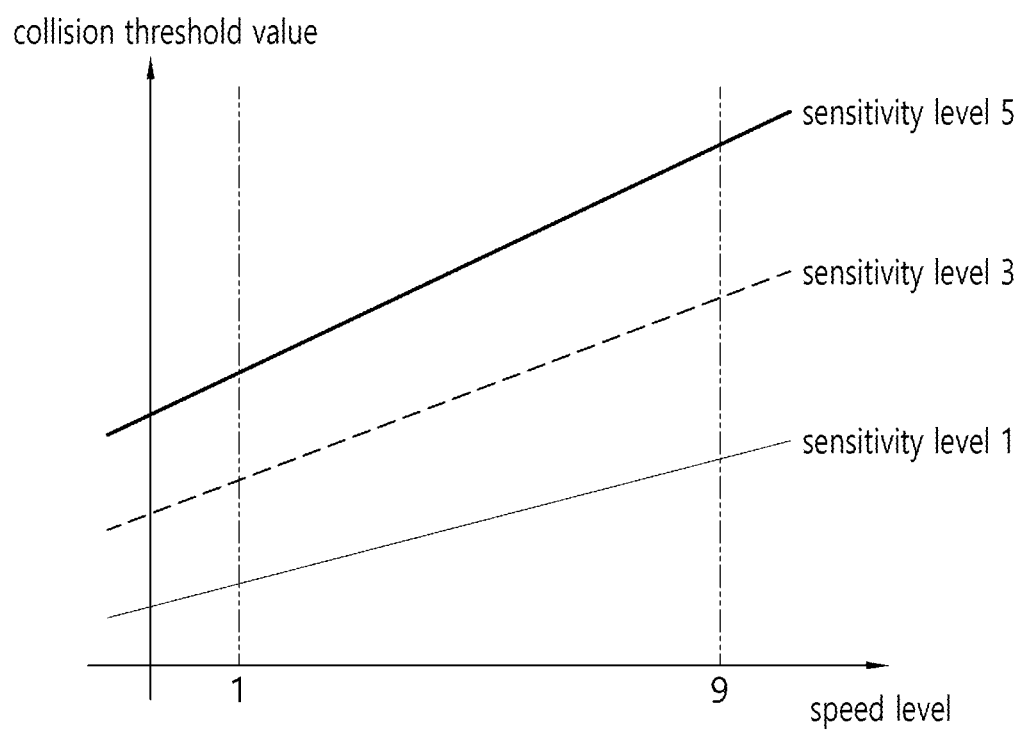
FIG. 11 is a diagram for describing a collision threshold function calculated in S16 of FIG. 7.

FIG. 7 is a flowchart for describing a method of automatically setting collision sensitivity of a collaborative robot according to the disclosure, FIG. 8 is a graph showing torque-related data obtained in step S15 of FIG. 7, FIG. 9 is a diagram for describing a method of selecting a maximum value in torque-related data obtained at a first speed level in step S16 of FIG. 7, FIG. 10 is a diagram for describing a method of selecting a maximum value in torque-related data obtained at a second speed level in step S16 of FIG. 7, and FIG. 11 is a diagram for describing a collision threshold function calculated in S16 of FIG. 7.

As shown in FIG. 7, he method of automatically setting the collision sensitivity of the collaborative robot according to the disclosure includes the steps of providing an option selection UI (S11), selecting a program (S12), selecting collision sensitivity (S13), actuating the collaborative robot (S14), obtaining the torque-related data (S15), calculating the collision threshold value (S16), and displaying calculation results (S17).

In the step S11 of providing the option selection UI, the collision-sensitivity setting unit 30 may make the display 40 to display a UI through which at least one option is selectable for automatically setting the collision sensitivity.

The option selection UI may provide a UI through which a program for actuating the collaborative robot 10 is selectable, and a collision sensitivity level is selectable. In addition, a user may select a precision level or a calculation area through the option selection UI.

The precision level may be used as a factor for determining a level of difference between the collision threshold value and the maximum value of the torque-related data when the collision threshold value (to be described later) is calculated. For example, the lower the precision level selected by a user, the greater the difference between the collision threshold value and the maximum value of the torque-related data. The higher the precision level selected by a user, the smaller the difference between the collision threshold value and the maximum value of the torque-related data.

The calculation area is to select which one of a joint space, a work space and the joint and work spaces will be used as reference in calculating the moving paths of the joints 12, 13, 14, 15, 16 and 17 of the collaborative robot 10.

In case of the joint space, the turning angles of the joints 12, 13, 14, 15, 16 and 17 are calculated with respect to the joints 12, 13, 14, 15, 16 and 17 when an end portion of the terminal joint, i.e., the sixth joint 17 of the collaborative robot moves from a first point to a second point. Therefore, the moving path may include a curve when the end portion of the sixth joint 17 moves from the first point to the second point.

On the other hand, in case of the work space, the turning angles of the joints 12, 13, 14, 15, 16 and 17 are calculated so that the end portion of the sixth joint 17 moves the shortest distance connecting the first point and the second point when the end portion of the terminal joint, i.e., the sixth joint 17 of the collaborative robot moves from the first point to the second point.

The joint and work spaces are based on combination of the calculation of the joint space and the calculation of the work space.

In the step S12 of selecting the program, a user selects the program corresponding to the actuation of the collaborative robot 10, of which collision detecting sensitivity is desired to be set, among the plurality of programs 31, 32 and 33 through the option selection UI displayed on the display 40.

For example, when the collaborative robot 10 is used in working for a pick-and-place action and it is desired to set the sensitivity of the collaborative robot 10 to a collision during the pick-and-place action, a user selects the program 31 corresponding to the pick-and-place action among the plurality of programs 31, 32 and 33 in a program selection option of the UI.

In the step S13 of selecting the collision sensitivity, a user selects the collision sensitivity level in the option selection UI displayed on the display 40.

The collision sensitivity level selectable by a user in the option selection UI may include a plurality of levels, and a user may select a desired level among the plurality of levels.

For example, the option selection UI may provide five collision sensitivity levels (very sensitive, sensitive, moderate, insensitive, and very insensitive), and a user may select the collision sensitivity level in consideration of the work environment or the like of the collaborative robot 10.

For example, when a user selects 'very sensitive' among the collision sensitivity levels, the collision threshold value may be set to discontinue the actuation of the collaborative robot 10 even through a very weak collision or external force is exerted during the actuation of the collaborative robot 10. When a user selects 'very insensitive' among the collision sensitivity levels, the collision threshold value may be set to continue the actuation of the collaborative robot 10 if a very strong collision or external force is not exerted during the actuation of the collaborative robot 10.

Further, a user may select the options about the precision level and the calculation area as necessary in the foregoing option selection UI.

When a user sets the precision level low, the collision threshold value is higher than that of when the precision level is set high, and thus set to discontinue the actuation of the collaborative robot 10 when a relatively strong collision with the collaborative robot 10 is made.

According to which one of the joint space, the work space, and the joint and work spaces selected for the calculation area by a user, the collaborative robot 10 operates based on the calculation area selected by the user.

In the step S14 of actuating the collaborative robot, the controller 35 controls the collaborative robot 10 based on the program selected by a user in the step S12. When a user selects the calculation area in the option selection UI, the controller 35 may control the collaborative robot 10 as limited within the selected calculation area.

Further, the controller 35 may repetitively control the collaborative robot 10 so that the collaborative robot 10 can perform the action corresponding to the selected program at different speed levels. The controller 35 controls the collaborative robot 10 to repeat the action corresponding to the program and gradually increase the speed of the action. For example, the controller 35 may repetitively control the collaborative robot 10 at first to tenth speed levels.

In the step S15 of obtaining the torque-related data, the collaborative robot 10 transmits the torque-related data generated in the joints 12, 13, 14, 15, 16 and 17 of the collaborative robot 10 during the actuation to the collision-sensitivity setting unit 30, and the data collector 36 of the collision-sensitivity setting unit 30 collects the torque-related data.

The torque-related data may include current values to be applied to the actuators for actuating the joints 12, 13, 14, 15, 16 and 17 of the collaborative robot 10, or torque measured by the torque sensor for measuring the torque exerted on the joints 12, 13, 14, 15, 16 and 17.

As shown in FIG. 8, the torque-related data T is continuously collected while the joints 12, 13, 14, 15, 16 and 17 are operating.

Referring to FIG. 8, the data collector 36 may collect the torque-related data T as divided into a plurality of sections A, B, C and D while the collaborative robot 10 completes one action.

Although FIG. 8 shows an example of performing the collection by dividing time taken for the collaborative robot 10 to complete an action corresponding to one program into four sections A, B, C and D, the time may be divided into four or more sections or four or less sections according to embodiments.

Further, although FIG. 8 shows an example of collecting four pieces of torque-related data T in one section, four or more pieces of torque-related data T may be collected according to embodiments.

In addition, although FIG. 8 shows an example of setting sections by dividing the time taken for the collaborative robot 10 to complete the action corresponding to one program into a plurality of sections, the sections may be divided based on not the time but the number of collected pieces of the torque-related data or motion units performed in one actuation.

Meanwhile, when the controller 35 controls the collaborative robot 10 to repetitively perform the action at different speed levels, the data collector 36 may classify the collected torque-related data according to the speed levels, as shown in FIGS. 9 and 10.

In the step S16 of calculating the collision threshold value, the operator 37 calculates the collision threshold value based on the torque-related data collected by the data collector 36.

As shown in FIG. 9, the operator 37 calculates average values of the torque-related data of the joints 12, 13, 14, 15, 16 and 17 according to the sections, and selects the maximum value among the calculated average values according to the sections.

For example, when the first joint 12 has an average value of $T_{avg}1\text{-}2$ of the torque-related data in a first section A, an average value of $T_{avg}1\text{-}2$ of the torque-related data in a second section B, an average value of $T_{avg}1\text{-}3$ of the torque-related data in a third section C, and an average value of $T_{avg}1\text{-}4$ of the torque-related data in a fourth section D, and the maximum value among them is the average value $T_{avg}1\text{-}3$, the average value of $T_{avg}1\text{-}3$ of the torque-related data in the third section C is selected as data related to the maximum torque exerted on the first joint 12 in the action corresponding to the program selected in the step S12.

In a similar manner, data related to the maximum torque exerted in the action corresponding to the program selected in the step S12 is selected with regard to the joints 12, 13, 14, 15, 16 and 17.

When the controller 35 actuates the collaborative robot 10 at one speed level in the step S14, the operator 37 calculates the collision threshold value with a numerical value higher than the maximum torque-related data selected by applying a factor, which is linearly or nonlinearly proportional to the collision sensitivity selected by a user in the step S14, to the maximum torque-related data selected with regard to the joints 12, 13, 14, 15, 16 and 17.

For example, when the option selection UI provides five selectable collision sensitivity levels (very sensitive, sensitive, moderate, insensitive, and very insensitive), the factor added to or multiplied by the maximum torque-related data according to the levels is increased in order of very sensitive, sensitive, moderate, insensitive, and very insensitive. The factor may be a constant or may be a function varied depending on a variable.

Further, when the precision level is selectable in the option selection UI, the factor added to or multiplied by the maximum torque-related data is varied depending on the precision levels.

For example, when three precision levels of low, medium and high are given, the factor added to or multiplied by the maximum torque-related data according to the levels is decreased in order of low, medium and high. The factor may be a constant or may be a function varied depending on a variable. The factor for the precision level may be different from the factor for the collision sensitivity level.

Meanwhile, when the controller 35 actuates the collaborative robot 10 at a plurality of speed levels in the step S14, as shown in FIGS. 9 and 10 the operator 37 calculates the averages value of the torque-related data of each of the joints 12, 13, 14, 15, 16 and 17 according to the speed levels in each section, and selects the maximum value among the calculated average values according to the sections as the maximum torque-related data.

Further, the operator 37 calculates the collision threshold value by applying a factor to the maximum torque-related data of the joints 12, 13, 14, 15, 16 and 17 according to the speed levels, and derives a function of the collision threshold values according to the speed levels.

For example, the function of the maximum torque-related data at the first speed level, the maximum torque-related data at the second speed level, . . . , the maximum torque-related data at the $N^{th}$ speed level of the first joints 12, 13, 14, 15, 16 and 17, i.e., the collision threshold function is derived.

The collision threshold function may be a linear function or a quadratic or higher nonlinear function.

For example, when the collision threshold function is given as the linear function, the collision threshold function may be defined as follows.

$$f(x)=s(ax+b)$$

where, f(x) is the collision threshold function, s is the collision sensitivity level, and x is the speed level FIG. 11 is a graph of the collision threshold function defined as the linear function.

The operator 37 calculates the collision threshold value of each joint according to the speed levels, and derives the parameters of the collision threshold function (f(x)) from the calculated collision threshold values.

In the step S17 of displaying the calculation results, the communicator 34 transmits the collision threshold value and/or the parameters a and b of the collision threshold function (f(x)) calculated in the step S16 to the display 40, so that the display 40 can display the collision threshold value and/or the parameters a and b of the collision threshold function (f(x)) as the calculation results of the operator 37 on the screen thereof.

The collision-sensitivity setting unit 30 updates the controller 35 with the calculated collision threshold value and/or collision threshold function (f(x)). Then, it is determined that a collision occurs when external force stronger than the updated collision threshold value and/or collision threshold function (f(x)) is exerted during the actuation of the collaborative robot 10, and the actuation of the collaborative robot 10 is stopped.

As described above, by the system for automatically setting the collision sensitivity of the collaborative robot and the method of automatically setting the collision sensitivity of the collaborative robot according to the disclosure, a user only needs to select an option (the program, the collision sensitivity, the precision, and the calculation area) suitable for the work environment in which the collaborative robot 10 is used, and the collision-sensitivity setting unit 30 automatically controls the collaborative robot 10 and controls the data to automatically calculate and apply the collision threshold value and/or the collision threshold function suitable for the selected option, so that even a user unprofessional at the collaborative robot 10 can easily adjust the collision sensitivity of the collaborative robot 10 according to conditions of a work site.

It will be understood by a person having ordinary knowledge in the art to which the disclosure pertains that the disclosure may be embodied in other specific forms without changing the technical spirit or essential features. Therefore, it should be understood that the foregoing embodiments are for illustrative purposes only and not restricted in all aspects. The scope of the disclosure is defined by the following claims rather than the foregoing detailed description, and all changes or modifications from the meaning and scope of the claims and their equivalents should be construed as being included in the scope of the disclosure.

The invention claimed is:

1. A method of automatically setting collision sensitivity of a collaborative robot, the method comprising:
    applying a current value to an actuator provided in each of joints of the collaborative robot to actuate the collaborative robot;
    measuring, based on the current value or using a torque sensor, torque exerted on each of the joints of the collaborative robot during actuation of the collaborative robot, thereby obtaining torque-related data related to the torque; and
    calculating a collision threshold value based on the obtained torque-related data,
    wherein the calculating of the collision threshold value comprises:
        calculating an average value of the obtained torque-related data according to sections;
        selecting a maximum value among the average values of the sections; and
        calculating the collision threshold value based on the selected maximum value.

2. The method according to claim 1, wherein the torque-related data comprises the current value applied to the actuator provided in each of the joints of the collaborative robot.

3. The method according to claim 1, further comprising selecting a collision sensitivity level,
    wherein the calculating of the collision threshold value comprises calculating the collision threshold value based on the selected collision sensitivity level and the obtained torque-related data.

4. The method according to claim 3, wherein the collision threshold value is calculated in proportion to the selected collision sensitivity level.

5. The method according to claim 1, further comprising:
    providing a user interface; and
    selecting, using the user interface, one of a plurality of programs that cause the collaborative robot to be actuated in different actions,
    wherein the actuating of the collaborative robot comprises actuating the collaborative robot based on a program selected among the plurality of programs.

6. The method according to claim 1, wherein the collision threshold value is calculated individually for each of the joints of the collaborative robot.

7. A method of automatically setting collision sensitivity of a collaborative robot, the method comprising:
    applying a current value to an actuator provided in each of joints of the collaborative robot to actuate the collaborative robot;
    measuring, based on the current value or using a torque sensor, torque exerted on each of the joints of the collaborative robot during actuation of the collaborative robot, thereby obtaining torque-related data related to the torque; and
    calculating a collision threshold value based on the obtained torque-related data,
    wherein
    the actuating of the collaborative robot comprises repetitively actuating the collaborative robot at different speed levels,
    the obtaining of the torque-related data comprises obtaining the torque-related data according to speed levels, and
    the calculating of the collision threshold value comprises calculating a function for calculating the collision threshold value by using a speed level as a variable based on the torque-related data obtained according to the speed levels.

8. The method according to claim 7, further comprising displaying a parameter of the calculated function on a screen.

9. The method according to claim 7, wherein the torque-related data comprises the current value applied to the actuator provided in each of the joints of the collaborative robot.

10. The method according to claim 7, further comprising selecting a collision sensitivity level,
    wherein the calculating of the collision threshold value comprises calculating the collision threshold value based on the selected collision sensitivity level and the obtained torque-related data.

11. The method according to claim 10, wherein the collision threshold value is calculated in proportion to the selected collision sensitivity level.

12. The method according to claim 7, further comprising:
    providing a user interface; and
    selecting, using the user interface, one of a plurality of programs that cause the collaborative robot to be actuated in different actions,
    wherein the actuating of the collaborative robot comprises actuating the collaborative robot based on a program selected among the plurality of programs.

13. The method according to claim 7, wherein the collision threshold value is calculated individually for each of the joints of the collaborative robot.

* * * * *